United States Patent
Palumbo

(10) Patent No.: US 6,221,143 B1
(45) Date of Patent: Apr. 24, 2001

(54) CATIONIC PIGMENTS AND AQUEOUS COMPOSITIONS CONTAINING SAME

(75) Inventor: Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/522,880

(22) Filed: Mar. 10, 2000

Related U.S. Application Data

(60) Provisional application No. 60/124,069, filed on Mar. 12, 1999.

(51) Int. Cl.[7] .................................................. C09D 11/02
(52) U.S. Cl. ..................... 106/31.6; 106/31.85; 106/472; 106/473; 106/476; 106/478; 106/499; 106/505
(58) Field of Search ................................ 106/31.6, 31.85, 106/472, 473, 476, 478, 499, 505

(56) References Cited

U.S. PATENT DOCUMENTS

| | | | |
|---|---|---|---|
| 5,554,739 | 9/1996 | Belmont | 534/885 |
| 5,571,311 | 11/1996 | Belmont et al. | 106/20 |
| 5,630,868 | 5/1997 | Belmont et al. | 106/31.75 |
| 5,672,198 | 9/1997 | Belmont et al. | 106/20 |
| 5,698,016 | 12/1997 | Adams et al. | 106/316 |
| 5,707,432 | 1/1998 | Adams et al. | 106/31.6 |
| 5,713,988 | 2/1998 | Belmont et al. | 106/31.6 |
| 5,803,959 | 9/1998 | Johnson et al. | 106/31.75 |
| 5,837,045 | 11/1998 | Johnson et al. | 106/31.85 |
| 5,851,280 | 12/1998 | Belmont et al. | 106/472 |
| 5,885,335 | 3/1999 | Adams et al. | 106/316 |
| 5,895,522 | 4/1999 | Belmont et al. | 106/31.6 |
| 5,922,118 | 7/1999 | Johnson et al. | 106/31.6 |
| 5,955,232 | 9/1999 | Little et al. | 430/106 |
| 5,958,999 | 9/1999 | Bates et al. | 523/161 |
| 5,968,243 | 10/1999 | Belmont et al. | 106/31.65 |
| 6,042,643 | 3/2000 | Belmont et al. | 106/472 |
| 6,069,190 * | 5/2000 | Bates et al. | 523/161 |

FOREIGN PATENT DOCUMENTS

| | | | |
|---|---|---|---|
| 0 839 883 | 5/1998 | (EP) | C09D/11/00 |
| WO96/18688 | 6/1996 | (WO) | C09C/1/56 |
| WO96/18690 | 6/1996 | (WO) | C09C/1/56 |
| WO96/18695 | 6/1996 | (WO) | C09D/11/00 |
| WO96/18696 | 6/1996 | (WO) | C09D/11/02 |
| WO97/47697 | 12/1997 | (WO) | C09D/11/00 |
| WO97/47699 | 12/1997 | (WO) | C09D/11/00 |
| WO97/48769 | 12/1997 | (WO) | C09B/67/22 |
| WO99/05575 | 2/1999 | (WO) | G03G/9/09 |
| WO99/31175 | 6/1999 | (WO) | C08K/9/04 |
| WO99/38921 | 8/1999 | (WO) | C09C/1/56 |
| WO99/51690 | 10/1999 | (WO) | C09B/69/00 |
| WO00/22051 | 4/2000 | (WO) | C09C/1/56 |
| WO00/28386 | 5/2000 | (WO) | G03G/9/09 |

OTHER PUBLICATIONS

International Search Report for PCT/US00/06262 mailed Aug. 1, 2000.

U.S. application No. 09/672,328, entitled "Modified Pigments Having Steric and Amphiphilic Groups" filed Sep. 29, 2000.

* cited by examiner

*Primary Examiner*—Helene Klemanski

(57) ABSTRACT

The present invention relates to cationic pigments having an organic group which comprises: a) at least one aromatic group, at least one $C_{1-20}$ alkyl group, or both; and b) at least one cationically charged ionic group, at least one cationically chargeable ionizable group or both, and a corresponding counter-anion. The cationic pigments of the present invention have been found useful in aqueous or solvent based compositions and particularly in ink compositions, especially ink jet ink compositions. A method for preparing the cationic pigments is also disclosed.

56 Claims, No Drawings

CATIONIC PIGMENTS AND AQUEOUS COMPOSITIONS CONTAINING SAME

This application claims priority to U.S. Provisional Patent Application Ser. No. 60/124,069, filed on Mar. 12, 1999.

BACKGROUND OF THE INVENTION

1. Field of the Invention

The present invention relates to cationic pigments and aqueous compositions containing the same and, more particularly, to ink compositions useful for imaging applications, such as ink jet ink compositions.

2. Discussion of the Related Art

Aqueous systems are increasingly being used in many applications such as automotive and industrial coatings, paints, papers, inks, toners, adhesives, latexes, etc. as manufacturers face increased pressure to replace conventional solvent based systems. Such aqueous systems are known and generally contain a colorant, such as a dye, which is soluble in the aqueous vehicle, such as water or a mixture of water and a water-soluble or water-miscible organic solvent.

Although dye-based compositions are readily utilized, dyes have several disadvantages when used in aqueous ink systems. For example, dyes, being water-soluble in a water/organic mixture, may dissolve and run when exposed to moisture or water. Dye images may further smear or rub-off on contact with felt pen markers or upon being rubbed or touched by a finger. Dyes also exhibit poor light stability when exposed to visible or ultraviolet light.

Pigments are also known as colorants in aqueous compositions but have not received a wide degree of acceptance in aqueous systems, such as ink jet inks, because of problems associated with the performance and reliability of the composition, i.e., print properties, stability, latency, and the like. Examples of such pigments include carbon black, titanium dioxide white, cobalt blue ($CoO-Al_2O_3$), phthalocyanine blue, phthalocyanine green, and chrome yellow ($PbCrO_4$).

U. S. Pat. Nos. 5,571,311; 5,630,868; 5,707,432; 5,803,959; and 5,837,045 and PCT Publication No. WO 96/18688; and PCT Publication No. WO 96/18695 (all incorporated in their entirety herein by reference), describe novel surface-modified pigments and aqueous compositions containing such surface-modified pigments. Although such surface-modified pigments are a considerable improvement over dye-based or traditional pigment systems (i.e. pigments requiring stabilization with a polymer or surfactant compositions), a continuing need exists for improved cationic based pigments, as well as aqueous or solvent based compositions containing such pigments, especially for use in ink compositions which require long term colloidal stability and lightfastness. It is also desirable to produce improved aqueous ink compositions which exhibit improved recoverability in their respective printing systems while providing good print properties. A further need exists for improved aqueous ink compositions which generate print images having improved waterfastness.

SUMMARY OF THE INVENTION

The present invention relates to cationic pigments having an organic group which comprises: a) at least one aromatic group, at least one $C_1-C_{20}$ alkyl group, or both; and b) at least one cationically charged ionic group, at least one cationically chargeable ionizable group or both, and a corresponding counter-anion. In one embodiment of the present invention, the corresponding counter-anion is formed from hydroxy acids, such as a hydroxy carboxylic acid, a polyhydroxy carboxylic acid, a hydroxy sulfonic acid, a polyhydroxy sulfonic acid, a hydroxy sulfinic acid, a polyhydroxy sulfinic acid, a hydroxy hydrogen sulfate, a polyhydroxy hydrogen sulfate, and mixtures thereof. In a second embodiment of the present invention, the corresponding counter-anion is fluoride. In a third embodiment of the present invention, the corresponding counter-anion is mono-carboxy glycols, mono-sulfo glycols, mono-sulfinate glycols or mono-sulfate glycols, such as mono-carboxy or mono-sulfo ethylene glycol or polyethylene glycol; mono-carboxy or mono-sulfo propylene glycol; or polypropylene glycol, and mixtures thereof. In a fourth embodiment of the present invention, the corresponding counter-anion is a counter-anion formed from an aromatic carboxylic acid, aromatic sulfonic acid, aromatic sulfinic acid, aromatic hydrogen sulfate, or mixtures thereof.

Methods for producing the cationic pigments of the present invention described above are also disclosed. For example, a method of preparing a cationic pigment is disclosed including the steps of: preparing the cationic pigment dispersion having at least one organic group, the organic group comprises: a) at least one aromatic group, at least one $C_1-C_{20}$ alkyl group, or both; and b) at least one cationically charged ionic group, at least one cationically chargeable ionizable group, or both, and a corresponding counter-anion; exchanging said corresponding counter-anion of said pigment dispersion with hydroxide; and adding one equivalent of an acid to said pigment dispersion to produce a cationic pigment with the desired corresponding counter-anion of said acid.

The present invention is further directed to ink compositions incorporating one or more of the cationic pigments described above.

The cationic pigments of the present invention may be used in aqueous or solvent based compositions containing conventional pigments. Such compositions include, for example, automotive and industrial coatings, paints, printing plates, papers, toners, inks (particularly, ink jet ink compositions), adhesives, latexes, textiles and fibers. The cationic pigments may be tailored to provide compatibility with the particular aqueous or solvent based system and provide easier, more complete dispersion, improved colloidal stability, improved smear resistance, improved waterfastness, good inter-color bleed qualities, and greater color intensity and shades, as well as decap stability and reliability of the printhead.

DETAILED DESCRIPTION OF THE PRESENT INVENTION

The present invention relates to cationic pigments having attached at least one organic group which comprises: a) at least one aromatic group, at least one $C_1-C_{20}$ alkyl group, or both; and b) at least one cationically charged ionic group, at least one cationically chargeable ionizable group, or both, and a corresponding counter-anion.

In one embodiment of the present invention, the corresponding counter-anion is formed from hydroxy acids. The hydroxy acids can be polyhydroxy acids. Also, the hydroxy acids can be unsubstituted or substituted. Examples of such hydroxy acids include, but are not limited to, a hydroxy carboxylic acid, a polyhydroxy carboxylic acid, a hydroxy sulfonic acid, a polyhydroxy sulfonic acid, a hydroxy sulfinic acid, a polyhydroxy sulfinic acid, a hydroxy hydrogen sulfate, a polyhydroxy hydrogen sulfate, and mixtures thereof. Specific examples of such counter-anions include, but are not limited to, hydroxy alkyl carboxylates, polyhydroxy alkyl carboxylates, hydroxy alkyl sulfonates, polyhydroxy alkyl sulfonates, hydroxy alkyl sulfinates, polyhydroxy alkyl sulfinates, hydroxy alkyl sulfates, polyhydroxy alkyl sulfates, and mixtures thereof. Representative examples of such corresponding counter-anions include, but are not limited to, d-glucuronate, d-gluconate, isethionate, lactate, l-ascorbate, and mixtures thereof In a second embodiment of the present invention, the corresponding counter-anion is fluoride ($F^-$).

In a third embodiment of the present invention, the corresponding counter-anion is a mono-carboxy glycol, mono-sulfo glycol, mono-sulfinate glycol, or mono-sulfate glycol. The glycols can be polyglycols. Also, the glycols are mono-substituted.

Examples include, but are not limited to, mono-carboxy-, mono-sulfo-, mono-sulfinate-, or mono-sulfate- ethylene glycol; mono-carboxy-, mono-sulfo-, mono-sulfinate-, or mono-sulfate- polyethylene glycol; mono-carboxy, mono-sulfo, mono-sulfinate-, or mono-sulfate- propylene glycol; mono-carboxy-, mono-sulfo-, mono-sulfinate-, or mono-sulfate- polypropylene glycol; and mixtures thereof. The preferred counter-anion for this embodiment is represented by the formula:

RO—(CHR'CHR"—O)$_y$—(CH$_2$)$_m$—X where R is hydrogen, a substituted or unsubstitued alkyl group, or a substituted or unsubstituted aryl group (e.g., an aromatic group); R' and R", which can be the same or different, are either hydrogen or a methyl group; y is an integer from about 1 to about 500 and preferably from about 1 to about 100; m is an integer from about 1 to 12 and preferably from about 1 to about 3; and X is —$CO_2^-$,—$SO_3^-$,—$OSO_3^-$,—$SO_2^-$ or mixtures thereof. Preferably, the alkyl group is a $C_1$–$C_6$ alkyl group. The alkyl group may be branched or unbranched. Examples of the aryl can be the same as examples provided below for aromatic group which may form part of the organic group.

In a fourth embodiment of the present invention, the corresponding counter-anion is a counter-anion formed from an aromatic carboxylic acid, aromatic sulfonic acid, aromatic sulfinic acid, aromatic hydrogen sulfate, or mixtures thereof. These various aromatic containing counter-anions can be unsubstituted or substituted. Specific examples of counter-anions include, but are not limited to, aromatic carboxylates, aromatic sulfonates, aromatic sulfinates, aromatic sulfates, or mixtures thereof. Representative examples of such corresponding counter-anions include, but are not limited to, unsubstituted or substituted benzoate, benzene sulfonate, 2-furoate, or mixtures thereof.

The preferred acid forms and corresponding anion forms can be summarized as follows:

| Acid Form | Anion Form |
|---|---|
| R—$CO_2H$, carboxylic acid | R—$CO_2^-$, carboxylate |
| R—$SO_3H$, sulfonic acid | R—$SO_3^-$, sulfonate |
| R—$SO_2H$, sulfinic acid | R—$SO_2^-$, sulfinate |
| R—$OSO_3H$, hydrogen sulfate | R—$OSO_3^-$, sulfate |

EMBODIMENT #1

R=hydroxy- or polyhydroxy-alkyl (or substituted alkyl) substituent

Example: R=$CH_3CH(OH)$—

EMBODIMENT #3

R=glycol or polyglycol substituent (mono-substituted)
Example: R=HO—$CH_2CH_2$—O—$CH_2$—$CH_2$—

EMBODIMENT #4

R=aromatic (or substituted aromatic) substituent
Example: R=$C_6H_5$—

The cationic pigment of the present invention has an organic group comprising at least one aromatic group which includes, but is not limited to, unsaturated cyclic hydrocarbons containing one or more rings and may be substituted or unsubstituted, for example with alkyl groups. Aromatic groups include aryl groups (for example, phenyl, naphthyl, anthracenyl, and the like) and heteroaryl groups (for example, imidazolyl, pyrazolyl, pyridinyl, thienyl, thiazolyl, furyl, triazinyl, indolyl, and the like). Preferably, the aromatic group is phenyl or napthyl, substituted or unsubstituted. An organic group comprising at least one $C_1$–$C_{20}$ alkyl group may be branched or unbranched, substituted or unsubstituted. In a preferred embodiment, at least one aromatic group or at least one $C_1$–$C_{20}$ alkyl group of the organic group is directly attached to the pigment.

A preferred set of organic groups which may be used are organic groups substituted with at least one ionic group, at least one ionizable group, or mixtures thereof as a finctional group. The ionizable group is one capable of forming a cationic group in the medium of use (i.e., a cationically chargeable ionizable group). The ionic group for purposes of the present invention is a cationic group and the ionizable group may form a cation.

The aromatic group may be further substituted or unsubstituted, for example, with alkyl or hydroxyl groups. More preferably, the aromatic group is a phenyl or a naphthyl group and the cationic ionic group or ionizable group is a pyridinium group, a trialkylammonium group, a phosphonium group, a sulfonium group, and mixtures thereof. Amines (primary, secondary, and/or tertiary amines) represent examples of ionizable functional groups that form cations or cationic groups. For example, amines may be protonated to form anmonium groups in acidic media. Preferably, an organic group having an amine substituent has a $pK_b$ of less than 5. Quaternary ammonium groups (—$NR_3^+$), quaternary phosphonium groups (—$PR_3^+$) and sulfonium groups (—$SR_2^+$) also represent examples of cationic groups. Preferably, the organic group contains an aromatic group such as a phenyl or a naphthyl group and a quaternary annonium or a quaternary phosphonium or sulfonium group. Quaternized cyclic amines, and even quaternized aromatic amines, can also be used as the organic group. Thus, N-substituted pyridinium compounds, such as N-methyl-pyridyl, can be used in this regard.

Examples of organic groups that are cationic in nature include, but are not limited to, —$C_6H_4N(CH_3)_3^+Y^-$, —$C_6H_4COCH_2N(CH_3)_3^+Y^-C_6H_4(NC_5H_5)^+Y^-$, —$(C^.H_4N)C_2H_5^+Y^-$, —$C_6H_4COCH_2(NC_5H_5)^+Y^-$, —$(C_5H_4N)CH_3^+Y^-$, and —$C_6H_4CH_2N(CH_3)_3^+Y^-$, wherein $Y^-$ represents the corresponding counter-anion of the present invention. As recognized by those skilled in the art, $Y^-$ may be formed in-situ as part of the manufacturing process or may be formed through a typical salt swap or ion-exchange process. The positive charge in the formulas above primarily reside on the nitrogen.

The desired colored pigment may be chosen from a wide range of conventional colored pigments. The colored pigment can be white, blue, black, brown, cyan, green, violet, magenta, red, orange, yellow, as well as shades thereof, tones thereof, and mixtures thereof. Suitable classes of colored pigments include, for example, anthraquinones, phthalocyanine blues, phthalocyanine greens, disazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation. Examples of other suitable colored pigments are described in the *Colour Index,* 3rd edition (The Society of Dyers and Colourists, 1982) incorporated in its entirety herein by reference. Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Columbian Chemical Corporation) and MA100 and MA440 available from Mitsubishi Chemical Corporation. The colored pigment will typically have a wide range of BET surface areas, as measured by nitrogen adsorption. Preferably, the colored pigment has a surface area equal or greater than about 85 $m^2/g$, and more preferably equal or greater than about 100 $m^2/g$, thereby corresponding to a smaller primary/aggregate particle size. Such surface areas have been found to provide a more uniform distribution and efficient level of treating agent on the surface of the pigment and a higher percent yield of the surface-modified colored pigment after post processing techniques. If the preferred higher surface area of the colored pigment (thereby corresponding to a smaller particle size) is not readily available, it is well recognized by those skilled in the art that the colored pigment may be subject to conventional size comminution or reduction techniques, such as ball or jet milling, to reduce the pigment to the desired particle size.

The cationic pigment of the present invention can have more than one type of organic group attached, such as an organic group comprising at least one aromatic group and another organic group comprising at least one $C_1$–$C_{20}$ alkyl group and so on.

The cationic pigment of the present invention is prepared by subjecting a pigment, as described above, to a surface modification treatment which attaches the organic group to the surface of the pigment.

The following discussion is with reference to the preparation or manufacture of one preferred cationic pigment, carbon black. However, other cationic pigments other than carbon black can be similarly prepared. The cationic carbon black may be prepared preferably by reacting carbon black with a diazonium salt in a liquid reaction medium to attach at least one organic ionic group to the surface of the carbon black. The diazonium salt may contain the organic ionic group to be attached to the carbon black. A diazonium salt is an organic compound having one or more diazonium groups. The diazonium salt is typically generated by the reaction of the diazotizing agent (such as any metal or organic nitrite including, for example, ammonium nitrite, butyl nitrite, dicyclohexylammonium nitrite, ethylnitrite, isoamylnitrite, lithium nitrite, sodium nitrite, potassium nitrite, or zinc nitrite, and may also include nitrous acid, nitrogen oxide, nitrogen dioxide, and mixtures of any one of these) and the treating agent/reagents under suitable conditions. The cationic treating agent itself may contain nitrite in which case the diazonium salt is produced by subsequent addition of an acid. Thus, the treating agent contains the diazotizing agent (e.g., nitrite) which can be transformed into the diazonium salt by the addition of an acid.

Examples of cationic pigments, namely carbon black based pigments, and various preferred methods for their preparation are described in International Publication No. WO96/18688, published Jun. 20, 1996 and entitled "Reaction of Carbon Black with Diazonium Salts, Resultant Carbon Black Products and Their Uses," U.S. Pat. No. 5,554,739 entitled "Reaction of Carbon Materials With Diazonium Salts and Resultant Carbon Products," International Publication No. WO 96/18696, published Jun. 20, 1996 and entitled "Aqueous Inks and Coatings Containing Modified Carbon Products," as well as U.S. Pat. Nos. 5,851,280; 5,837,045; 5,803,959; 5,672,198; 5,571,311; 5,630,868; 5,707,432; 5,803,959; 5,698,016; 5,713,988; and International Publication Nos. WO 97/47697 and WO 97/47699, all incorporated in their entirety herein by reference.

In the preferred preparation of the above cationic carbon black, the diazonium salt need only be sufficiently stable to allow reaction with the carbon black. Thus, the reaction can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. The diazonium salts may be pre-formed prior to addition of the pigment or prepared in situ.

In addition, the cationic pigment having attached ionic groups may further be prepared using known techniques to those skill in the art, such as by adding the pigment to a continuously operating pin mixer with an aqueous solution containing the desired reagents for attaching the organic groups. Alternatively, the pigment, the reagents for attaching the organic group to the pigment, and the counter-anion source may be added simultaneously in a suitable batch or continuous mixer. The cationic pigment can be prepared using the same techniques set forth in U.S. Pat. Nos. 5,851,280; 5,837,045; 5,803,959; 5,672,198; 5,571,311; 5,630,868; 5,707,432; 5,803,959; 5,554,739; 5,698,016; 5,713,988; and International Publication Nos. WO 97/47697 and WO 97/47699, all incorporated in their entirety herein by reference.

The overall amount of treating agent (e.g., the diazonium salt precursor which contains the organic group) added to provide the cationic modification to the pigment is sufficient to achieve colloidal stability of the cationic pigment in a particular composition, as well as to improve any particular property, such as waterfastness, of the desired end product application. When low levels of treating agent are desired, it has been found that the organic group is typically introduced (i.e. present in the reaction solution) at a level from about 0.01 to about 5.0 micromoles/m$^2$ of the pigment used, based upon the nitrogen surface area of the pigment. When traditional levels of treating agent are desired, it has been found that the organic group is typically introduced (i.e. present in the reaction solution) at a level from about 5.0 to about 50.0 micromoles/m$^2$ of the pigment used, based upon the nitrogen surface area of the pigment. Lastly, it will be appreciated by those skilled in the art that the pH of the reaction mixture may be varied depending of the particular treating agent and the most efficient reaction conditions and may, for example, be at a pH around neutral if appropriate.

The resulting cationic pigment products may be purified by washing, such as by filtration, to remove unreacted raw materials, byproduct salts, and other reaction impurities. The products may also be isolated, for example, by evaporation or it may be recovered by filtration and drying using known techniques to those skilled in the art. Dispersions of the cationic pigments of the present invention may be further purified or classified to remove impurities and other undesirable free species which can co-exist in the dispersion as a result of the manufacturing process. In a preferred embodiment, the cationic pigment dispersions are subjected to a classification step, such as centrifugation, to substantially remove particles having a size above about 1.0 micron, preferably above about 0.5 micron. In addition, the dispersion is preferably purified to remove any undesired free species, such as unreacted treating agent. Known techniques of ultrafiltration/diafiltration using a membrane or ion exchange may be used to purify the dispersion and remove a substantial amount of free ionic and unwanted species. Also preferred is an optional exchange of counterions whereby the counterions that form a part of the surface-modified color pigment are exchanged or substituted with alternative counterions utilizing known ion exchange techniques such as ultrafiltration, reverse osmosis, ion exchange columns and the like. Such additional classification and purification methods are more fully described in U.S. patent application Ser. No. 09/240,291, filed Jan. 29, 1999, the disclosure of which is fully incorporated herein by reference.

The cationic pigment of the present invention may be used in aqueous or solvent based compositions optionally containing conventional pigments. The following relating to ink compositions can be similarly applicable to other liquid systems, including, for example, coatings, papers, inks, toners, adhesives, latexes, textiles and fibers. Further, U.S. Pat. Nos. 5,851,280; 5,837,045; 5,803,959; 5,672,198; 5,571,311; 5,630,868; 5,707,432; 5,803,959; 5,554,739; 5,698,016; 5,713,988; and International Publication Nos. WO 97/47697; WO 97/47699; and WO 99/05575, all incorporated in their entirety herein by reference describe the incorporation of carbon black and/or other pigments in coatings, paper, inks, textiles, and/or toners, and the like which can be applied equally here for the cationic pigments of the present invention.

Ink compositions containing the cationic pigment prepared by the process of the present invention have been found suitable for use in imaging applications, particularly for use in ink jet inks. Such ink and ink jet ink compositions preferably exhibit improved formulation properties and storage stability. In addition, images generated from such ink and ink jet ink compositions preferably exhibit good waterfastness and color intensity.

The cationic pigment of the present invention is present in the aqueous or solvent based ink or ink jet ink composition in an amount effective to provide the desired image quality, e.g., optical density, without detrimentally affecting the performance of the ink. Typically, the cationic pigments will be present in an amount ranging from about 1% to about 20%, preferably from about 2% to about 10%, based on the weight of the ink composition. In addition, the cationic pigment is typically as small as possible to enable a stable colloidal suspension of the pigment in the liquid vehicle and to prevent clogging of the ink channels and nozzles when used in the desired printing application. For example, a preferred average particle size of the cationic pigment for use in a thermal ink jet printer are generally below 1.0 micron, preferably in a range from about 0.01 micron to about 0.3 micron. Also, the dispersion stability may be optimized by the appropriate choice of counter-anion and further the counter-anion can contribute to controlling the viscosity of the liquid system, such as the ink composition. For instance, excellent viscosity can be obtained when the counter-anion is fluoride.

The ink compositions of the present invention may be prepared utilizing conventional techniques known to those skilled in the art, such as combining or mixing the desired component in a suitable aqueous or solvent based medium. When the ink and ink jet ink compositions are aqueous based systems, a significant amount of water, preferably deionized or distilled water, is typically used. For example, the amount of water or similar medium is generally present in an amount ranging from about 50% to about 95%, preferably from about 60% to about 80%, based on the weight of the ink or ink jet ink composition.

The ink and ink jet ink compositions of the present invention may be buffered to the desired pH by the addition of a suitable base, such as sodium hydroxide, ammonium hydroxide, triethylamine, dimethylethanolamine, and the like, or a suitable acid, such as mineral acids, hydrochloric acid, sulfinic acid, and the like. In addition, a polymer which is soluble in the ink composition may be added to improve the waterfastness, rub resistance, and/or smear resistance of the images generated from the ink compositions.

By "soluble" is meant that the polymer will dissolve in the ink vehicle to form a one phase system. These polymers include, for example, polyvinyl alcohol, polyester, polyestermelamine, styrene-acrylic acid copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl napthalene-acrylic acid copolymers, vinyl napthalene-maleic acid copolymers and salts thereof. Additional polymers include polyvinylimidazole, derivatives of polyvinylimidazole, copolymers of vinylimidazole, copolymers of vinylimidazole derivatives, polyvinylpyridine, derivatives of polyvinylpyridine, copolymers of vinylpyridine, copolymers of vinylpyridine derivatives, polyethyleneimine, derivatives of polyethyleneimine, and mixtures thereof, as described in PCT Publication No. WO 96/18688, the disclosure of which is fully incorporated herein by reference.

Suitable additives can also generally be incorporated into the ink or ink jet ink composition to impart a number of desired properties while maintaining the stability of the compositions. For example, a surfactant or suitable polymer may be used to further enhance the colloidal stability of the colored pigment in the ink composition. Other additives are well known in the art and include humectants, biocides, binders, drying accelerators, penetrants, and the like. Examples of humectants include ethylene glycol, propylene glycol, diethylene glycol, glycerine, dipropylene glycol, polyethylene glycol, polypropylene glycol, alkane diols, amides, ethers, carboxylic acids, esters, alcohols, organosulfides, organosulfoxides, sulfones, alcohol derivatives, 2-pyrrolidone, ether derivatives, amino alcohols, and ketones. The amount of a particular additive will vary depending on a variety of factors but are generally present in an amount ranging between 0% and 40%, preferably between 0.1% and 10%, although the amount may be outside this range. Certain counter-anions, such as polyhydroxylated acids, can serve as the humectant as well when associated with the pigment. This advantage avoids the use of free humectants in the compositions.

Printed images may be generated from the ink or ink jet ink compositions of the present invention by incorporating such compositions into a suitable printing apparatus, and generating an image onto a substrate. Suitable ink jet printers include, for example, thermal printers, piezoelectric printers, continuous printers, valve printers, and the like. Similarly, any suitable substrate can be employed including plain papers, bonded papers, coated papers, transparency materials, textile materials, plastics, polymeric films, inorganic substrates, and the like.

As noted above, the cationic pigments of the present invention may be used in other aqueous or solvent based systems including, but not limited to, coatings, paints, papers, adhesives, latexes, toners, textiles and fibers. For example, the aqueous or solvent based systems may be prepared by combining or mixing the cationic pigment with suitable resins, such as alkyds, acrylics, polyesters, silicates, urethanes, epoxies and the like.

Non-limiting illustrations of the present invention follow.

EXAMPLE 1

Preparation of a Cationic Pigment

A solution of 13.02 g of N-(4-aminophenyl)pyridinium nitrite in 188 ml of de-ionized water was combined in a suitable reaction mixer with 100 g of a carbon black having a surface area of 200 m$^2$/g and a DBPA of 117 mL/100 g and the resultant mixture heated at 70° C. To this was added 37.8 mL of 10% nitric acid and mixing continued at 70–80° C. for 2–3 hours. During this time, bubbles were released as the diazonium salt $N_2C_6H_4NC_5H_5^{2+}$ was formed and reacted with the carbon black. The resulting dispersion was first centrifuged with a Carr continuous centrifuge at a G force of about 15,000 and at a flow rate of about 600 ml/min. and then purified by ultrafiltration/diafiltration until the permeate was colorless and filtered to 0.5 microns. The cationic pigment product had attached —$C_6H_4NC_5H_5^+$ groups and the corresponding counter-anion was $NO_3^-$.

Cationic pigments with the counter-anions described in Table 1 were prepared using one of the following methods.

Method A

The cationic pigment dispersion was passed through a 1" glass column containing IRA402(OH) anion exchange resin to produce its corresponding hydroxide form. To this was added one equivalent of the acid of the desired counter-anion. For example, 200 grams of a 15% dispersion of the cationic pigment of Example 3 was passed through a column containing 60 ml of the anion exchange resin. The resulting eluent was collected, and 179.8 mg of 95% formic acid was then added dropwise to 92.77 grams of the eluent while stirring to give the product of Example 17. Other examples were similarly prepared, except that the types or amounts of acid were varied depending on the desired counter-anion for the pigment dispersion.

Method B

IRA402(OH) anion exchange resin was first activated with the corresponding counter-anion of interest (using a 10% aqueous solution of the sodium salt of the desired counter anion). The activated resin was then used to anionically exchange the cationic pigment dispersion by utilizing either a column or batch exchange method.

Particle size distributions of the cationic pigments were measured using a MICROTRAC® Ultrafine Particle Analyzer (available from Honeywell, Minneapolis, Minn.). The following conditions were used: non-transparent, non-spherical particles; particle density 1.86g/m$^3$; water as the dispersing liquid; a run time of six minutes.

EXAMPLE 2

Preparation of a Cationic Pigment

A solution of 9.55 g of N-(4-aminophenyl)pyridinium nitrite in 191 ml of de-ionized water was combined in a suitable reaction mixer with 100 g of a carbon black having a surface area of 200 m$^2$/g and a DBPA of 117 mL100 g and the resultant mixture heated at 70° C. To this was added 27.7 mL of 10% nitric acid and mixing continued at 70–80° C. for 2–3 hours. During this time, bubbles were released as the diazonium salt $N_2C_6H_4NC_5H_5^{2+}$ was formed and reacted with the carbon black. The resulting dispersion was first centrifuged as in Example 1 and then purified by ultrafiltration/diafiltration until the permeate was colorless and filtered to 0.5 microns. The cationic pigment product had attached —$C_6H_4NC_5H_{5+}$ groups and the corresponding counter-anion was $NO_3^-$.

Cationic pigments with the counter-anions described in Table 1 were prepared using either Method A or Method B as described in Example 1 above.

Particle size distributions of the cationic pigments were measured using the same procedure set forth in Example 1 and are illustrated in Table 2.

TABLE 1

Physical Properties for Cationic Pigment Dispersions

| Example | Prepared From Example 1 or 2 | Counter-Anion (Method)* | % Solids | pH | Viscosity (cP) | Surface Tension (dyne/cm) |
|---|---|---|---|---|---|---|
| 1 | N/A | Nitrate | 15 | 4.2 | 3.95 | 75 |
| 2 | N/A | Nitrate | 15 | 5.5 | 3.9 | 73.8 |
| 3 | 1 | Acetate (B) | 12 | 4.8 | 2.76 | 74.8 |
| 4 | 1 | D-Gluconate (B) | 14 | 4.25 | 2.44 | 75.0 |
| 5 | 2 | Acetate (B) | 15 | 5.2 | 3.38 | 75.5 |
| 6 | 2 | Fluoride (B) | 15 | 4.75 | 2.96 | 77.0 |
| 7 | 2 | Chloride (B) | 15 | 5.5 | 4.85 | 76.2 |
| 8 | 2 | Bromide (B) | 15 | 4.61 | 5.0 | 76.6 |
| 9 | 2 | Iodide (B) | 15 | 4.2 | 7.86 | 76.2 |
| 10 | 2 | Isethionate (B) | 15 | 3.94 | 3.17 | 76.3 |
| 11 | 2 | D-Glucuronate (A) | 7.5 | 2.75 | n.d. | 74.3 |
| 12 | 2 | L-Ascorbate (A) | 7.5 | 3.25 | n.d. | 74.5 |
| 13 | 2 | Lactate (A) | 7.5 | 3.0 | n.d. | 74.9 |
| 14 | 2 | Benzoate (A) | 7.5 | 3.9 | n.d. | 76.0 |
| 15 | 2 | 2-Furoate (A) | 7.5 | 3.25 | n.d. | 75.8 |
| 16 | 2 | D-Gluconate (A) | 7.5 | 2.79 | n.d. | 76.0 |
| 17 | 2 | Formate (A) | 14 | 3.01 | 3.66 | 75.7 |
| 18 | 2 | MEEA (A) | 13.4 | 2.7 | 3.44 | n.d. |
| 19 | 2 | PEGI (A) | 13.4 | 6.35 | 3.5 | n.d. |

Abbreviations:
MEEA: 2-(2-(2-Methoxyethoxy)ethoxy)Acetic Acid (Aldrich Chem.);
PEGI: Poly(ethylene glycol) (750) monocarboxymethyl ether monomethyl ether (Polysciences, Inc.);
n.d.: not determined.

Examples 1–10 and 17–19 of Table 1 illustrate how viscosity may be varied by varying the counter-anion. Viscosity measurements, at about 15% solids content of each respective dispersion, shows that fluoride offers the lowest dispersion viscosity. To the extent that low viscosity ink jet inks are desirable, especially in thermal drop-on-demand print heads, low viscosity pigment dispersions are very useful. From the data shown it can be appreciated that Examples 5 (acetate), 6 (fluoride), and 10 (isethionate) shown improved viscosity compared to nitrate (i.e., compared to Example 2.

TABLE 2

Particle Size Distribution of Cationic Carbon Black Dispersions

| Example | UPA mV (microns) | UPA 100% (microns) |
|---|---|---|
| 1 | 0.1237 | 0.4088 |
| 2 | 0.1239 | 0.3437 |
| 3 | 0.1432 | 0.3437 |
| 4 | 0.1279 | 0.2891 |
| 5 | 0.1387 | 0.4088 |
| 6 | 0.1423 | 0.4088 |
| 7 | 0.1296 | 0.3437 |
| 8 | 0.1324 | 0.3437 |
| 9 | 0.134 | 0.4088 |
| 10 | 0.1344 | 0.3437 |
| 11 | 0.137 | 0.4861 |
| 12 | 0.1186 | 0.3437 |
| 13 | 0.1347 | 0.5781 |
| 14 | 0.1151 | 0.3437 |
| 15 | 0.1431 | 0.3437 |
| 16 | 0.1453 | 0.4861 |
| 17 | 0.1283 | 0.4088 |

TABLE 2-continued

Particle Size Distribution of Cationic Carbon Black Dispersions

| Example | UPA mV (microns) | UPA 100% (microns) |
|---|---|---|
| 18 | 0.1411 | 0.4088 |
| 19 | 0.1568 | 0.5781 |

*The Particle Size Distributions were determined utilizing the conditions provided in Example 1.

The cationic pigments of the present invention were readily dispersible in an aqueous medium and exhibited good color shade.

EXAMPLE 3

Preparation of Ink Jet Inks

The various cationic carbon black pigment dispersions of Examples 1–19 (the pigments were added to distilled water to form an aqueous dispersion) were formulated into an ink having the following components, by weight: 5% cationic pigment, 7.0% glycerol, 70% trimethylolpropane, 5% di(ethylene glycol), and the remainder distiled water.

The resultant ink was used to generate black print on a standard paper set (Xerox 4024 dp 20#, Fox Bond 25% cotton, and Canon papers NSK, NDK, KG and ND). Values for Optical Density, waterfastness, and edge acuity were measured and/or observed and are illustrated in Table 3. Optical density (OD) was determined by Macbeth densitometer RD 915S (available from Gretagmacbeth LLC, New Windsor, N.Y.) following ANSI Procedure CGATS,4-1993.

Waterfastness (WF) was determined by first hanging the print out at an approximately 45° angle, squirting 25 ml of water at pre-determined time intervals (1 minute after printing, 5 minutes after printing, etc.) and observing any color runoff. The print was considered to be waterfast at the point in time when the runoff from the water squirt was clear. Edge acuity or intercolor bleed was determined qualitatively by observation of a printed test pattern in which pigment inkjet ink of the present invention is printed directly adjacent to a conventional dye-based inkjet ink (preferably yellow). After printing, the edge which defines the interface between these two printed inks was studied for any observable bleed and/or feathering of one ink into the other. No observable intercolor bleed would be judged "E", minimal intercolor bleed: "G", significant intercolor bleed: "F".

TABLE 3*

| Example | OD | WF** | Edge Acuity** |
|---|---|---|---|
| 1 | 1.32 | F | E |
| 2 | 1.47 | G | E |
| 3 | 1.30 | F | E |
| 4 | 1.29 | G | E |
| 5 | 1.43 | G | E |
| 6 | 1.43 | G | E |
| 7 | 1.44 | G | E |
| 8 | 1.46 | G | E |
| 9 | 1.49 | G | E |
| 10 | 1.44 | G | E |
| 11 | 1.48 | E | E |
| 12 | 1.47 | E | E |
| 13 | 1.43 | G | E |
| 14 | 1.48 | E | E |
| 15 | 1.44 | E | E |
| 16 | 1.44 | G | E |
| 17 | 1.48 | G | E |
| 18 | 1.42 | E | E |
| 19 | 1.49 | G | E |

*Average values obtained on 6 paper types: Xerox 4024 DP 20#, Fox River Bond 25% cotton, and Canon NSK, NDK, KG, and ND.
**F = fair, G = good, E = excellent.

It will be appreciated from the Examples in Table 3 that excellent OD and edge acuity were obtained when all of the examples listed are used to prepare ink jet inks. Improvements in waterfastness compared to the nitrate examples were seen with Examples 11, 12, 14, 15, and 18.

The inks containing the cationic pigments as described herein demonstrated high edge acuity, high optical density, fast drying times, high water-solublefastness, excellent decap stability, and good smearfastness.

The cationic pigments of the present invention also provided, even in an un-optimized formulation, good print properties and an attractive alternative to commercially available dye and pigment color products. The resulting ink jet inks produced an aesthetically pleasing black print.

As noted above, the cationic pigments prepared by the process of the present invention may be useful in a wide variety of aqueous or solvent based applications and, in particular, ink compositions to provide the desired color and intensity. Unlike conventional pigments, the surface-modified colored pigment is readily dispersed in the desired liquid vehicle. In addition, the surface-modified colored pigment is colloidally stable in the liquid vehicle and does not require conventional milling, nor the aid of a dispersant. The surface-modified colored pigment requires only low shear mixing or stirring into the liquid vehicle.

The foregoing description of preferred embodiments of the present invention has been presented for purposes of illustration and description. It is not intended to be exhaustive or to limit the invention to the precise form disclosed, and modifications and variations are possible in light of the above teachings, or may be acquired from practice of the present invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A cationic pigment comprising a pigment having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion, wherein said corresponding counter-anion is formed from at least one hydroxy acid.

2. The cationic pigment of claim 1 wherein said at least one hydroxy acid is a hydroxy carboxylic acid, a polyhydroxy carboxylic acid, a hydroxy sulfonic acid, a polyhydroxy sulfonic acid, a hydroxy sulfinic acid, a polyhydroxy sulfinic acid, a hydroxy hydrogen sulfate, a polyhydroxy hydrogen sulfate, or mixtures thereof.

3. The cationic pigment of claim 1, wherein said counter-anion is a hydroxy alkyl carboxylate, a polyhydroxy alkyl carboxylate, a hydroxy alkyl sulfonate, a polyhydroxy alkyl sulfonate, a hydroxy alkyl sulfinate, a polyhydroxy alkyl sulfinate, a hydroxy alkyl sulfate, a polyhydroxy alkyl sulfate, or mixtures thereof.

4. The cationic pigment of claim 1, wherein said pigment is white, blue, black, brown, cyan, green, violet, magenta, red, orange, yellow, shades thereof, tones thereof, or mixtures thereof.

5. The cationic pigment of claim 4, wherein said black pigment is carbon black.

6. The cationic pigment of claim 1, wherein said ionic or ionizable group is a quaternary ammonium salt; a primary amine; a secondary amine; a tertiary amine; a pyridinium salt; derivatives thereof; or mixtures thereof.

7. The cationic pigment of claim 1, wherein said organic group is —$C_6H_4N(CH_3)_3{}^+Y^-$, —$C_6H_4COCH_2N(CH_3)_3{}^+Y^-$, —$C_6H_4NC_5H_5){}^+Y^-$, —$(C_5H_4N)C_2H_5{}^+Y^-$, —$C_6H_4COCH_2(NC_5H_5){}^+Y^-$, —$(C_5H_4N)CH_3{}^+Y^-$, and ——$C_6H_4CH_2N(CH_3)_3{}^+Y^-$, wherein $Y^-$ is the corresponding counter-anion.

8. The cationic pigment of claim 1, wherein said organic group is attached to the surface of said colored pigment in an amount sufficient to improve the dispersibility of said surface-modified colored pigment in a liquid medium.

9. An ink composition comprising at least one cationic pigment and at least one liquid vehicle, wherein said at least one cationic pigment comprises a pigment having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion, wherein said corresponding counter-anion is formed from at least one hydroxy acid.

10. The ink composition of claim 9, wherein said at least one hydroxy acid is a hydroxy carboxylic acid, a polyhydroxy carboxylic acid, a hydroxy sulfonic acid, a polyhydroxy sulfonic acid, a hydroxy sulfinic acid, a polyhydroxy sulfinic acid, a hydroxy hydrogen sulfate, a polyhydroxy hydrogen sulfate, or mixtures thereof.

11. The ink composition of claim 9, wherein said counter-anion is a hydroxy alkyl carboxylate, a polyhydroxy alkyl carboxylate, a hydroxy alkyl sulfonate, a polyhydroxy alkyl sulfonate, a hydroxy alkyl sulfinate, a polyhydroxy alkyl sulfinate, a hydroxy alkyl sulfate, a polyhydroxy alkyl sulfate, or mixtures thereof.

12. The ink composition of claim 9, wherein said pigment is white, blue, black, brown, cyan, green, violet, magenta, red, orange, yellow, shades thereof, tones thereof, or mixtures thereof.

13. The ink composition of claim 12, wherein said black pigment is carbon black.

14. The ink composition of claim 9, wherein said ionic or ionizable group is a quaternary ammonium salt; a primary amine; a secondary amine; a tertiary amine; a pyridinium salt; derivatives thereof; or mixtures thereof.

15. The ink composition of claim 9, wherein said organic group is $-C_6H_4N(CH_3)_3{}^+Y^-$, $-C_6H_4COCH_2N(CH_3)_3{}^+Y^-$ $-C_6H_4(NC_5H_5)^+Y^-$, $-(C_5H_4N)C_2H_5{}^+Y^-$, $-C_6H_4COCH_2(NC_5H_5)^+Y^-$, $-(C_5H_4N)CH_3{}^+Y^-$, and $-C_6H_4CH_2N(CH_3)_3{}^+Y^-$, wherein Y is the corresponding counter-anion.

16. The ink composition of claim 9, wherein said ink composition is an ink jet ink composition.

17. The ink composition of claim 16, wherein said pigment is white, blue, black, brown, cyan, green, violet, magenta, red, orange, yellow, shades thereof, tones thereof, or mixtures thereof.

18. The ink composition of claim 17, wherein said black pigment is carbon black.

19. A cationic pigment comprising a pigment having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion, wherein said corresponding counter-anion is fluoride.

20. The cationic pigment of claim 19, wherein said pigment is white, blue, black, brown, cyan, green, violet, magenta, red, orange, yellow, shades thereof, tones thereof, or mixtures thereof.

21. The cationic pigment of claim 20, wherein said black pigment is carbon black.

22. The cationic pigment of claim 19, wherein said ionic or ionizable group is a quaternary ammonium salt; a primary amine; a secondary amine; a tertiary amine; a pyridinium salt; derivatives thereof; or mixtures thereof.

23. The cationic pigment of claim 19, wherein said organic group is $-C_6H_4N(CH_3)_3{}^+Y^-$, $-C_6H_4COCH_2N(CH_3)_3{}^+Y^-$, $-C_6H_4(NC_5H_5)^+Y^-$, , $-(C_5H_4N)C_2H_5{}^+Y^-$, $-C_6H_4COCH_2(NC_5H_5)^+Y^-$, $-(C_5H_4N)CH_3{}^+Y^-$, and $-C_6H_4CH_2N(CH_3)_3{}^+Y^-$, wherein $Y^-$ is the corresponding counter-anion.

24. The cationic pigment of claim 19, wherein said organic group is attached to the surface of said colored pigment in an amount sufficient to improve the dispersibility of said surface-modified colored pigment in a liquid medium.

25. An ink composition comprising at least one cationic pigment and at least one liquid vehicle, wherein said at least one cationic pigment comprises a pigment having at least one organic group, wherein said organic group comprises: a) at least one aromatic group, at least one $C_1$–$C_2$ alkyl group, or both; and b) at least one catonically charged ionic group, at least one cationically chargeable ionizable group, or both, and a corresponding counter-anion, wherein said corresponding counter-anion is fluoride.

26. The ink composition of claim 25, wherein said ink composition is an ink jet ink composition.

27. The ink composition of claim 26, wherein said pigment is white, blue, black, brown, cyan, green, violet, magenta, red, orange, yellow, shades thereof, tones thereof, or mixtures thereof.

28. The ink composition of claim 27, wherein said black pigment is carbon black.

29. A cationic pigment comprising a pigment having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion, wherein said corresponding counter-anion is a mono-carboxy glycol, a mono-sulfo glycol, a mono-sulfinate glycol, a mono-sulfate glycol, or mixtures thereof.

30. The cationic pigment of claim 29, wherein said counter-anion is a mono-carboxy-, mono-sulfo-, mono-sulfinate-, mono-sulfate- ethylene glycol; a mono-carboxy-, mono-sulfo-, mono-sulfinate-, mono-sulfate- polyethylene glycol; a mono-carboxy-, mono-sulfo-, mono-sulfinate-, mono-sulfate- propylene glycol; a mono-carboxy-, mono-sulfo-, mono-sulfinate-, mono-sulfate- polyproylene glycol, or mixtures thereof.

31. The cationic pigment of claim 29, wherein said pigment is white, blue, black, brown, cyan, green, violet, magenta, red, orange, yellow, shades thereof, tones thereof, or mixtures thereof.

32. The cationic pigment of claim 31, wherein said black pigment is carbon black.

33. The cationic pigment of claim 29, wherein said ionic or ionizable group is a quaternary ammonium salt; a primary amine; a secondary amine; a tertiary amine; a pyridinium salt; derivatives thereof; or mixtures thereof.

34. The cationic pigment of claim 29, wherein said organic group is $-C_6H_4N(CH_3)_3{}^+Y^-$, $-C_6H_4COCH_2N(CH_3)_3{}^+Y^-$, $-C_6H_4(NC_5H_5)^+Y^-$, $-(C_5H_4N)C_2H_5{}^+Y^-$, $-C_6H_4COCH_2(NC_5H_5)^+Y^-$, $-(C_5H_4N)CH_3{}^+Y^-$, and $-C_6H_4CH_2N(CH_3)_3{}^+Y^-$, wherein $Y^-$ is the corresponding counter-anion.

35. The cationic pigment of claim 29, wherein said counter-anion has the formula:

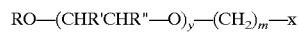

$$RO-(CHR'CHR''-O)_y-(CH_2)_m-x$$

wherein R is hydrogen, alkyl group, or aryl group; R' and R", which are the same or different, are either hydrogen or a methyl group; y is an integer from about 1 to about 500; m is an integer from about 1 to 12; and X is $-CO_2{}^-$, $-SO_3$, $-OSO_3{}^-$, $-SO_2{}^-$, and mixtures thereof.

36. The cationic pigment of claim 35, wherein y is an integer from about 1 to about 100 and m is an integer from about 1 to about 3.

37. The cationic pigment of claim 29, wherein said organic group is attached to the surface of said colored pigment in an amount sufficient to improve the dispersibility of said surface-modified colored pigment in a liquid medium.

38. An ink composition comprising at least one cationic pigment and at least one liquid vehicle, wherein said at least one cationic pigment comprises a pigment having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion, wherein said corresponding counter-anion is a mono-carboxy glycol, mono-sulfo glycol, mono-sulfinate glycol, mono-sulfate glycol, or mixtures thereof.

39. The ink composition of claim 38, wherein said counter-anion has the formula:

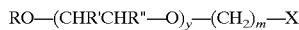

wherein R is hydrogen, alkyl group, or aryl group; R' and R", which are the same or different, is hydrogen or a methyl group; y is an integer from about 1 to about 500; m is an integer from about 1 to 12; and X is —$CO_2^-$, —$SO_3^-$, —$OSO_3^-$,—$SO_2^-$, and mixtures thereof.

40. The ink composition of claim 38, wherein said ink composition is an ink jet ink composition.

41. The ink composition of claim 40, wherein said pigment is white, blue, black, brown, cyan, green, violet, magenta, red, orange, yellow, shades thereof, tones thereof, or mixtures thereof.

42. The ink composition of claim 41, wherein said black pigment is carbon black.

43. A cationic pigment comprising a pigment having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion, wherein said corresponding counter-anion is formed from at least one aromatic carboxylic acid, aromatic sulfonic acid, aromatic sulfinic acid, aromatic hydrogen sulfate, or mixtures thereof.

44. The cationic pigment of claim 43, wherein said counter-anion is an aromatic carboxylate, an aromatic sulfonate, an aromatic sulfinate, an aromatic sulfate, or mixtures thereof.

45. The cationic pigment of claim 43, wherein said pigment is white, blue, black, brown, cyan, green, violet, magenta, red, orange, yellow, shades thereof, tones thereof, or mixtures thereof.

46. The cationic pigment of claim 45, wherein said black pigment is carbon black.

47. The cationic pigment of claim 43, wherein said ionic or ionizable group is a quaternary ammonium salt; a primary amine; a secondary amine; a tertiary amine; a pyridinium salt, derivatives thereof; or mixtures thereof.

48. The cationic pigment of claim 43, wherein said organic group is —$C_6H_4N(CH_3)_3^+Y^-$, —$C_6H_4COCH_2N(CH_3)_3^+Y^-$, —$C_6H_4(NC_5H_5)^+Y^-$, —$(C_5H_4N)C_2H_5^+Y^-$, —$C_6H_4COCH_2(NC_5H_5)^+Y^-$, —$(C_5H_4N)CH_3^+Y^-$, and —$C_6H_4CH_2N(CH_3)_3^+Y^-$, wherein $Y^-$ is the corresponding counter-anion.

49. The cationic pigment of claim 43, wherein said organic group is attached to the surface of said colored pigment in an amount sufficient to improve the dispersibility of said surface-modified colored pigment in a liquid medium.

50. An ink composition comprising at least one cationic pigment and at least one liquid vehicle, wherein said at least one cationic pigment comprises a pigment having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion, wherein said corresponding counter-anion is formed from at least one aromatic carboxylic acid, aromatic sulfonic acid, aromatic sulfinic acid, aromatic hydrogen sulfate, or mixtures thereof.

51. The ink composition of claim 50, wherein said ink composition is an ink jet ink composition.

52. The ink composition of claim 51, wherein said pigment is white, blue, black, brown, cyan, green, violet, magenta, red, orange, yellow, shades thereof, tones thereof, or mixtures thereof.

53. The ink composition of claim 52, wherein said black pigment is carbon black.

54. A method of preparing a cationic pigment comprising the steps of:
    a) preparing a pigment dispersion having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion;
    b) exchanging said corresponding counter-anion of said pigment dispersion with hydroxide;
    c) adding one equivalent of hydroxy acid to said pigment dispersion to produce a cationic pigment with the corresponding counter-anion of said hydroxy acid.

55. A method of preparing a cationic pigment comprising the steps of:
    a) preparing a pigment dispersion having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion;
    b) exchanging said corresponding counter-anion of said pigment dispersion with hydroxide;
    c) adding one equivalent of acid comprising at least one mono-carboxy glycol, a mono-sulfo glycol, a mono-sulfinate glycol, a mono-sulfate glycol, or mixtures thereof, to said pigment dispersion to produce a cationic pigment with the corresponding counter-anion of said acid.

56. A method of preparing a cationic pigment comprising the steps of:
    a) preparing a pigment dispersion having at least one organic group, wherein said organic group comprises: a) at least one aromatic group, at least one $C_1$–$C_{20}$ alkyl group, or both; and b) at least one cationically charged ionic group, at least one cationically chargeable ionizable group, or both, and a corresponding counter-anion;
    b) exchanging said corresponding counter-anion of said pigment dispersion with hydroxide;
    c) adding one equivalent of acid comprising at least one aromatic carboxylic acid, aromatic sulfonic acid, aromatic sulfinic acid, aromatic hydrogen sulfate, or mixtures thereof, to said pigment dispersion to produce a cationic pigment with the corresponding counter-anion of said acid.

* * * * *